Dec. 19, 1950   S. J. SMITH   2,534,802
LIQUID LEVEL GAUGE
Filed April 8, 1946
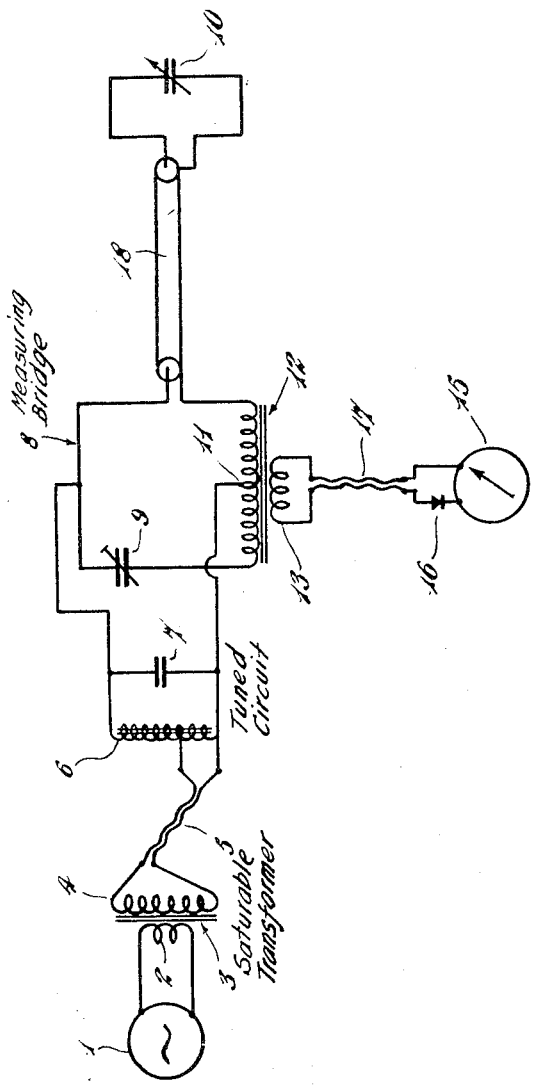
Inventor
Stanley James Smith
by Watson, Cole, Grindle & Watson
Attorneys Patented Dec. 19, 1950

2,534,802

UNITED STATES PATENT OFFICE 2,534,802

LIQUID LEVEL GAUGE

Stanley James Smith, London, England, assignor to West Road Co. Limited, a British company Application April 8, 1946, Serial No. 660,583
In Great Britain April 9, 1945

2 Claims. (Cl. 175—183)

This invention relates to liquid level gauges of the kind in which the rise and fall of the liquid varies the electrical capacity of a condenser. This condenser may comprise two spaced conductive electrodes arranged vertically in the liquid container or, in the case where the liquid is itself conductive a single insulated electrode may be used, the liquid forming the other electrode. In such arrangements the liquid level is measured by measuring the capacity of the condenser and for this purpose a source of alternating current is required. In the arrangement described in my prior United States Patent No. 2,377,275 the primary source of power was a low voltage battery and alternating current of suitable frequency was generated by means of a vacuum tube oscillator.

In some applications the use of batteries and vacuum tubes is inconvenient and a principal object of the present invention is to provide an alternative circuit arrangement which may be operated from a source of alternating current.

A further object of the present invention is to provide a novel arrangement for measuring or indicating the capacity of a condenser.

One form of the present invention will now be described with reference to the accompanying drawing in which is shown a circuit arrangement for measuring or indicating the capacity of a condenser.

A source of alternating current 1 is connected with the primary winding 2 of a transformer 3. This transformer is designed to have an iron core which becomes saturated under working conditions so that the output from the secondary winding 4 has a considerably distorted wave form and thus contains many harmonics. The output is fed over a cable 5 to a circuit, including inductance 6 and condenser 7, which is tuned to the frequency of a desired harmonic of the source. The output of the circuit 6, 7 is applied to a bridge network 8 which is made up of the condenser 9, the condenser 10, and the primary winding 11 of transformer 12. The condenser 9 is normally fixed but may be adjustable for zero setting or like purposes. The condenser 10 is the condenser whose value is to be measured or indicated, for example the measuring condenser of a liquid contents gauge. The condenser 10 is preferably connected with the bridge 8 over a low capacity cable 18 such as a co-axial cable. The secondary winding 13 of the transformer 12 is connected with the moving coil of an indicating instrument 15 through a rectifier 16, over the cable 17.

If the condensers 9 and 10 are of equal value the bridge network will be balanced and no current will flow through the indicator 15. If, however, the condensers are unequal current will flow through the indicator and if the value of the condenser 9 is maintained constant the scale of the indicator may be calibrated to indicate the magnitude of the condenser 10. Thus if this condenser is the measuring condenser of a liquid level indicating system the scale of the indicator 15 may be calibrated in terms of liquid level.

The frequency of operation of the bridge circuit will be governed to some extent by the size of the condenser 10. Thus in one application for a liquid level gauge on aircraft where a source of 400 c. p. s. alternating current is available a suitable frequency of the supply to the bridge circuit 8 was 2 k. c. s. and the circuit 6, 7 was accordingly tuned to select the fifth harmonic of the frequency of the source 1.

Errors in the reading of the indicator 15 due to variations in the supply voltage, which normally preclude the use of a bridge circuit operating in an unbalanced condition, are practically eliminated by the self-regulating action of the saturated transformer 3. This function of a saturated reactor is well known to those skilled in the art and it is sufficient to say that the output of the transformer 3 when saturated, at fundamental or at harmonic frequency, can be made to be substantially independent of the input. In addition compensation for fluctuations in frequency of the source 1 can be provided by tuning the circuit 6, 7 to a frequency somewhat below the frequency of the desired harmonic so that if the frequency of the source increases the output to the bridge will be reduced thus off-setting the reduced reactance of the condenser 10, and vice versa.

The compensation thus provided enables the very simple measuring circuit described to be used and the whole arrangement, with the exception of the measuring condenser 10 and the indicator 15, can be constructed as a self-contained unit of very small volume. In practice this unit may be connected with the source 1 and transformer 3, and with the indicator 15, over cables of any desired length while the connection between the unit and the measuring condenser 10 may also be of some length if the capacity of the condenser 10 is not too low and cable of small capacity is used.

I claim:

1. An electrical circuit arrangement for measuring capacity comprising a bridge network including in series a relatively fixed condenser, the condenser to be measured and the primary winding of a transformer, an indicating instrument connected with a secondary winding on said transformer and means for supplying alternating current to said network comprising a saturable reactor for connection with a source of alternating current, a circuit fed from said reactor and tuned to a harmonic of said source, and means connecting said circuit across one of said condensers and part of the primary winding of said transformer for feeding the harmonic frequency output of said circuit to said bridge network.

2. An electrical circuit arrangement for measuring capacity comprising a bridge network including in series four arms of which two consist of a relatively fixed condenser and the condenser to be measured and the other two arms consist of the center tapped primary winding of a transformer, an indicating instrument connected with a secondary winding on the said transformer, and means for supplying alternating current to said network comprising a saturable transformer having a primary winding for connection with a source of alternating current and a secondary winding, a circuit tuned to a harmonic of said source and connected with the secondary winding of said saturable transformer, and means connecting said circuit across the bridge network for supplying thereto current at the said harmonic frequency.

STANLEY JAMES SMITH.

REFERENCES CITED

The following references are of record in the file of this patent:

UNITED STATES PATENTS

| Number | Name | Date |
|---|---|---|
| 1,118,935 | Joly | Dec. 1, 1914 |
| 1,592,901 | Ohl | July 20, 1926 |
| 1,660,405 | Affel | Feb. 28, 1928 |
| 1,665,397 | Wunsch | Apr. 10, 1928 |
| 1,856,202 | Wilson | May 3, 1932 |
| 2,150,386 | Manley | Mar. 14, 1939 |
| 2,219,939 | Rich | Oct. 29, 1940 |
| 2,280,678 | Waymouth | Apr. 21, 1942 |
| 2,377,275 | Smith | May 29, 1945 |

FOREIGN PATENTS

| Number | Country | Date |
|---|---|---|
| 441,576 | Great Britain | Jan. 22, 1936 |